US011372748B2

(12) United States Patent
Muley et al.

(10) Patent No.: US 11,372,748 B2
(45) Date of Patent: Jun. 28, 2022

(54) METHOD AND SYSTEM FOR EXECUTING COMPATIBILITY TEST OF OPERATING SYSTEM

(71) Applicant: LANNER ELECTRONICS INC., New Taipei (TW)

(72) Inventors: Pragati Vithalrao Muley, Madalapur (IN); Yi-Pin Chan, New Taipei (TW)

(73) Assignee: LANNER ELECTRONICS INC., New Taipei (TW)

( * ) Notice: Subject to any disclaimer, the term of this patent is extended or adjusted under 35 U.S.C. 154(b) by 331 days.

(21) Appl. No.: 16/790,845

(22) Filed: Feb. 14, 2020

(65) Prior Publication Data
US 2020/0356470 A1 Nov. 12, 2020

(30) Foreign Application Priority Data
May 8, 2019 (TW) .................................. 108115805

(51) Int. Cl.
*G06F 11/00* (2006.01)
*G06F 11/36* (2006.01)
*G06F 9/4401* (2018.01)

(52) U.S. Cl.
CPC ........ *G06F 11/3688* (2013.01); *G06F 9/4406* (2013.01)

(58) Field of Classification Search
CPC ............................ G06F 11/3688; G06F 9/4406
See application file for complete search history.

(56) References Cited

U.S. PATENT DOCUMENTS

| | | | | |
|---|---|---|---|---|
| 5,619,659 A * | 4/1997 | Kikinis | ................ | H04N 1/0461 710/63 |
| 2004/0003222 A1 * | 1/2004 | Rich | .................. | G06F 11/2284 713/1 |
| 2004/0255179 A1 * | 12/2004 | Mayer | ................. | G06F 11/1441 714/E11.138 |
| 2010/0274998 A1 * | 10/2010 | Rogers | ................. | G06F 9/4418 713/323 |
| 2012/0159250 A1 * | 6/2012 | Aull | .................... | G06F 11/3672 714/E11.02 |
| 2014/0257828 A1 * | 9/2014 | Thornley | .............. | G06F 11/263 705/2 |
| 2017/0060560 A1 * | 3/2017 | Kumar | ...................... | G06F 8/65 |
| 2017/0060713 A1 * | 3/2017 | Wang | ................. | G06F 11/2294 |
| 2021/0034487 A1 * | 2/2021 | Kirita | ................. | G06F 11/2294 |

* cited by examiner

*Primary Examiner* — Joshua P Lottich

(57) ABSTRACT

Disclosures of the present invention describe a method and system for executing compatibility test of operating system. The system is principally a compatibility test management module that comprises a setting unit, a test execution unit, a compatibility determination unit, and a restart aborting unit. During executing a compatibility test for a host electronic device installed with an operating system, the compatibility test management module establishes an agent executor of the test execution unit and an agent executor of the restart aborting unit in the operating system, thereby executing at least one compatibility test for the operating system of the host electronic device during a reboot procedure. Moreover, the reboot aborting unit is configured to stop the agent executor of the test execution unit successively rebooting the host electronic device after the compatibility test is completed.

5 Claims, 2 Drawing Sheets

```
┌─────────────────────────────────────────────────────────────┐
│   Providing a compatibility test management module 11       │
│ comprising a setting unit 111, a test execution unit 112,   │
│ a compatibility determination unit 113, and a restart       │
│ aborting unit 114, and then using the setting unit 111 to   │
│ set a first number of reboot of a host electronic device 2  │
│           that is installed with an operating system 21     │
└─────────────────────────────────────────────────────────────┘
 ⎰
 S1                           │
                              ▼
       ┌──────────────────────────────────────────────┐
       │ The setting unit 111 generating a second     │
       │ number of reboot that is greater than the    │
       │            first number of reboot            │
       └──────────────────────────────────────────────┘
        ⎰
        S2                    │
                              ▼
       ┌──────────────────────────────────────────────┐
       │ Establishing an agent executor of the test   │
       │ execution unit 112 and an agent executor of  │
       │ the restart aborting unit 114 in the         │
       │ operating system 21 of the host electronic   │
       │                    device 2                  │
       └──────────────────────────────────────────────┘
        ⎰
        S3                    │
                              ▼
       ┌──────────────────────────────────────────────┐
       │ Letting the agent executor of the test       │
       │ execution unit 112 to reboot the host        │
       │ electronic device 2, so as to execute at     │
       │ least one compatibility test for the         │
       │ operating system 21 of the host electronic   │
       │ device 2 during at least one reboot procedure│
       └──────────────────────────────────────────────┘
        ⎰
        S4                    │
                              ▼
       ┌──────────────────────────────────────────────┐
       │ using the compatibility determination unit   │
       │ 113 to produce a compatibility verifying     │
       │ table for recording at least one             │
       │          compatibility test result           │
       └──────────────────────────────────────────────┘
        ⎰
        S5                    │
                              ▼
       ┌──────────────────────────────────────────────┐
       │ repeatedly executing the forgoing steps S4   │
       │ and S5 until an amount of reboot times of    │
       │ the host electronic device 2 reaches to the  │
       │            second number of reboot           │
       └──────────────────────────────────────────────┘
        ⎰
        S6
```

FIG. 2

METHOD AND SYSTEM FOR EXECUTING COMPATIBILITY TEST OF OPERATING SYSTEM

BACKGROUND OF THE INVENTION

1. Field of the Invention

The present invention relates to the technology field of operating systems, and more particularly to a method and system for executing compatibility test of operating system.

2. Description of the Prior Art

With the advance of science and technology, there are various industrial computers developed and proposes so as to be applied in different technology fields of network communication, industrial automation, medical apparatus, cloud computing, Internet of Things (IoTs), etc. It should know that, a specific application industrial computer certainly installed with a specifically-designed operating system, thereby facilitating a user or a controller operate the specific application industrial computer through the specifically-designed operating system. However, any one type of industrial computer commonly consists of many hardware modules, at least one firmware module, and an exclusive operating system thereof. As such, compatibility issue often occurs between the hardware module (or the firmware module) and the operating system of the industrial computer in case of the industrial computer is applied with a hardware update (or a firmware update). It is foreseeable that, the industrial computer fails to work normally when an incompatible hardware or firmware is installed in the industrial computer.

As a result, above descriptions have revealed that, how to prevent the compatibility issue from occurring between the hardware module (or the firmware module) and the operating system of the industrial computer has therefore become an important issue for solving. In view of that, inventors of the present application have made great efforts to make inventive research and eventually provided a method and system for executing compatibility test of operating system.

SUMMARY OF THE INVENTION

The primary objective of the present invention is to disclose a method and system for executing compatibility test of operating system. The system is principally a compatibility test management module that comprises a setting unit, a test execution unit, a compatibility determination unit, and a restart aborting unit. During executing a compatibility test for a host electronic device installed with an operating system, the compatibility test management module establishes an agent executor of the test execution unit and an agent executor of the restart aborting unit in the operating system, thereby executing at least one compatibility test for the operating system of the host electronic device during a reboot procedure. Moreover, the reboot aborting unit is configured to stop the agent executor of the test execution unit successively rebooting the host electronic device after the compatibility test is completed.

For achieving the primary objective of the present invention, the present invention provides an embodiment of the method for executing compatibility test of operating system, comprising following steps:

(1) providing a compatibility test management module comprising a setting unit, a test execution unit, a compatibility determination unit, and a restart aborting unit, and then using the setting unit to set a first number of reboot of a host electronic device that is installed with an operating system;

(2) the setting unit generating a second number of reboot that is greater than the first number of reboot;

(3) establishing an agent executor of the test execution unit and an agent executor of the restart aborting unit in the operating system of the host electronic device;

(4) letting the agent executor of the test execution unit to reboot the host electronic device, so as to execute at least one compatibility test for the operating system of the host electronic device during at least one reboot procedure;

(5) using the compatibility determination unit to produce a compatibility verifying table for recording at least one compatibility test result; and (6) repeatedly executing the forgoing steps (4) and (5) until an amount of reboot times of the host electronic device reaches to the second number of reboot.

In order to achieve the primary objective of the present invention, the present invention also provides an embodiment of the system for executing compatibility test of operating system, comprising:

a compatibility test management module, being provided with a setting unit, a test execution unit, a compatibility determination unit, and a restart aborting unit therein;

wherein the setting unit is configured for setting a first number of reboot of a host electronic device that is installed with an operating system, so as to subsequently generate a second number of reboot that is greater than the first number of reboot;

wherein the compatibility test management module establishes an agent executor of the test execution unit and an agent executor of the restart aborting unit in a host electronic device that is installed with an operating system, so as to use the agent executor of the test execution unit to reboot the host electronic device, thereby executing at least one compatibility test for the operating system of the host electronic device during a reboot procedure;

wherein the compatibility determination unit is configured to produce a compatibility verifying table for recording at least one compatibility test result, and the reboot aborting unit being configured to stop the agent executor of the test execution unit successively rebooting the host electronic device after the compatibility test is completed.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 2 shows a flowchart diagram of a method for executing compatibility test of operating system according to the present invention.

DETAILED DESCRIPTION OF THE PREFERRED EMBODIMENTS

Figure 1:
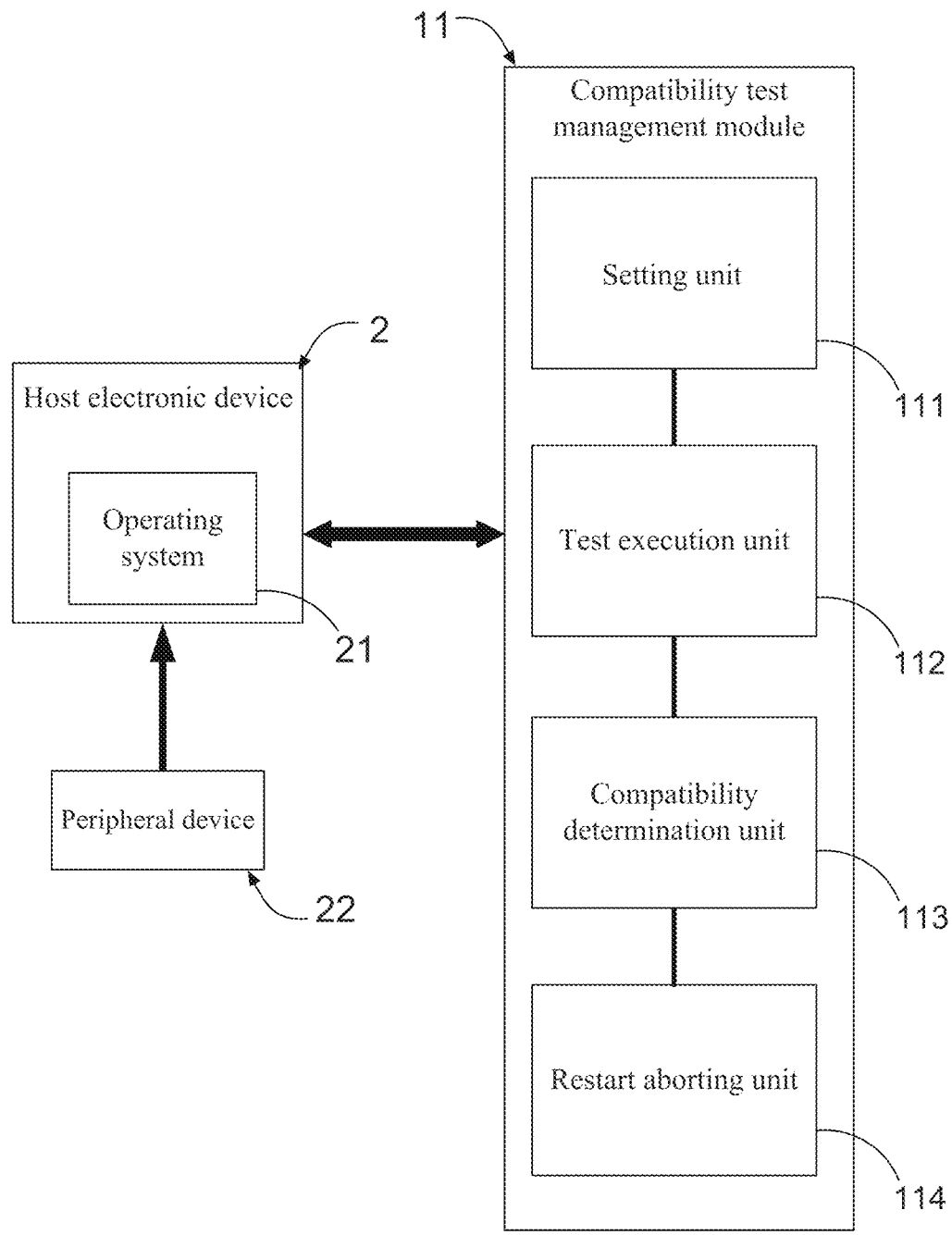
FIG. 1 shows a functional block diagram of a system for executing compatibility test of operating system according to the present invention.

To more clearly describe a method and system for executing compatibility test of operating system disclosed by the present invention, embodiments of the present invention will be described in detail with reference to the attached drawings hereinafter.

With reference to FIG. 1, there is shown a functional block diagram of a system for executing compatibility test of operating system according to the present invention. As FIG. 1 shows, the system 1 for executing compatibility test of operating system is principally a compatibility test management module 11 that comprises a setting unit 111, a test execution unit 112, a compatibility determination unit 113, and a restart aborting unit 114. The setting unit 111 is configured for allowing a user to set a first number of reboot of a host electronic device 2 that is installed with an operating system 21, so as to correspondingly generate a second number of reboot that is greater than the first number of reboot. As described in more detail below, the second number of reboot is equal to a summation of the first number of reboot and 1.

When using this system 1 to execute at least one compatibility test for the operating system 21 of the host electronic device 2, the compatibility test management module 11 establishes an agent executor of the test execution unit 112 and an agent executor of the restart aborting unit 114 in a host electronic device 2 that is installed with an operating system 21. The operating system 21 can be Windows 7, Windows 8, Windows server 2012, or Windows server 2016. In one embodiment, the said two agent executors can both be a shortcut executor that is set in a startup folder of the Windows operating system 21. As such, it is able to use the agent executor of the test execution unit 112 to reboot the host electronic device 2, thereby executing at least one compatibility test for the operating system 21 of the host electronic device 2 during a reboot procedure. After one time of the compatibility test is completed, the compatibility determination unit 113 is configured to produce a compatibility verifying table for recording at least one compatibility test result. Consequently, the agent executor (i.e., the shortcut executor) of the restart aborting unit 114 in the operating system 21 is configured to stop the agent executor of the test execution unit 112 successively rebooting the host electronic device 2 after the compatibility test is eventually completed.

The compatibility test is selected from the group consisting of compatibility test of driver program, compatibility test of hardware, and compatibility test of MAC address. Briefly speaking, after setting a first number of reboot of a host electronic device 2, the compatibility test management module 11 produce a shortcut executor of the test execution unit 112 to execute a few of compatibility tests by successively rebooting the host electronic device 2. Moreover, until an amount of reboot times of the host electronic device 2 reaches to the second number of reboot, a shortcut executor of the restart aborting unit 114, produced in the operating system by the compatibility test management module 11, is configured to stop the test execution unit 112 successively rebooting the host electronic device 2. On the other hand, FIG. 1 further depicts that, there is a peripheral device 22 electrically connected to the host electronic device 2. Before the restart aborting unit 114 aborts the host electronic device 2 from being rebooted again, a user is able to operate the peripheral device 22 such as a keyboard device to directly stop the successively rebooting the host electronic device 2. For example, the user can directly stop the successively rebooting the host electronic device 2 by press a set of hot keys like ctrl+alt+c that are pre-set on the keyboard.

Thus, above descriptions have clearly introduce the system 1 for executing compatibility test of operating system proposed by the present invention. Please refer to FIG. 2, which illustrates a flowchart diagram of a method for executing compatibility test of operating system according to the present invention. As FIG. 2 shows, the method flow is firstly proceeded to step S1: providing a compatibility test management module 11 comprising a setting unit 111, a test execution unit 112, a compatibility determination unit 113, and a restart aborting unit 114, and then using the setting unit 111 to set a first number of reboot of a host electronic device 2 that is installed with an operating system 21. Next, in step S2, the setting unit 111 generates a second number of reboot that is greater than the first number of reboot.

After the second number of reboot (i.e., the summation of the first number of reboot and 1) is generated, the method flow is subsequently proceeded to step S3, so as to establish an agent executor (i.e., an shortcut executor) of the test execution unit 112 and an agent executor (i.e., an shortcut executor) of the restart aborting unit 114 in the operating system 21 of the host electronic device 2. Therefore, in step S4, the agent executor of the test execution unit 112 is adopted for rebooting the host electronic device 2, so as to execute at least one compatibility test for the operating system 21 of the host electronic device 2 during a reboot procedure.

After one time of compatibility test is completed, the compatibility determination unit 113 is configured to produce a compatibility verifying table for recording at least one compatibility test result (step S5). It is worth noting that, the method flow would repeatedly proceeds back to the steps S4 and S5 until an amount of reboot times of the host electronic device 2 reaches to the second number of reboot. In other words, until an amount of reboot times of the host electronic device 2 reaches to the second number of reboot, the agent executor of the restart aborting unit 114, produced in the operating system 21 by the compatibility test management module 11, is configured to stop the test execution unit 112 successively rebooting the host electronic device 2.

Therefore, through above descriptions, the system and method for executing compatibility test of operating system proposed by the present invention have been introduced completely and clearly; in summary, the present invention includes the advantages of:

(1) The present invention disclose a method and system 1 for executing compatibility test of operating system. The system 1 is principally a compatibility test management module 11 that comprises a setting unit 111, a test execution unit 112, a compatibility determination unit 113, and a restart aborting unit 114. During executing a compatibility test for a host electronic device 2 installed with an operating system 21, the compatibility test management module 11 establishes an agent executor of the test execution unit 112 and an agent executor of the restart aborting unit 114 in the operating system 21, thereby executing at least one compatibility test for the operating system 21 of the host electronic device 2 during at least one reboot procedure. Moreover, the reboot aborting unit 114 is configured to stop the agent executor of the test execution unit 112 successively rebooting the host electronic device 2 after the compatibility test is completed.

The above description is made on embodiments of the present invention. However, the embodiments are not intended to limit scope of the present invention, and all equivalent implementations or alterations within the spirit of the present invention still fall within the scope of the present invention.

What is claimed is:

1. A method for executing compatibility test of operating system, comprising following steps:

(1) providing a compatibility test management module comprising a setting unit, a test execution unit, a compatibility determination unit, and a restart aborting unit, and then using the setting unit to set a first number of reboot of a host electronic device that is installed with an operating system;
(2) the setting unit generating a second number of reboot that is greater than the first number of reboot;
(3) establishing an agent executor of the test execution unit and an agent executor of the restart aborting unit in the operating system of the host electronic device;
(4) letting the agent executor of the test execution unit to reboot the host electronic device, so as to execute at least one compatibility test for the operating system of the host electronic device during at least one reboot procedure;
(5) using the compatibility determination unit to produce a compatibility verifying table for recording at least one compatibility test result; and
(6) repeatedly executing the foregoing steps (4) and (5) until an amount of reboot times of the host electronic device reaches to the second number of reboot.

2. The method of claim 1, wherein the compatibility test is selected from the group consisting of compatibility test of driver program, compatibility test of hardware, and compatibility test of MAC address.

3. The method of claim 1, wherein the second number of reboot is equal to a summation of the first number of reboot and 1.

4. The method of claim 1, wherein the operating system is selected from the group consisting of Windows 7, Windows 8, Windows server 2012, and Windows server 2016.

5. The method of claim 1, further comprising following step of (7) using the reboot aborting unit to stop the agent executor of the test execution unit successively rebooting the host electronic device.

* * * * *